(12) United States Patent
Endo et al.

(10) Patent No.: US 11,733,704 B2
(45) Date of Patent: Aug. 22, 2023

(54) CONSTRUCTION-VEHICLE AUTONOMOUS TRAVEL CONTROL DEVICE

(71) Applicant: SAKAI HEAVY INDUSTRIES, LTD., Tokyo (JP)

(72) Inventors: Ryohei Endo, Saitama (JP); Shigeki Kushida, Saitama (JP)

(73) Assignee: SAKAI HEAVY INDUSTRIES, LTD, Tokyo (JP)

( * ) Notice: Subject to any disclaimer, the term of this patent is extended or adjusted under 35 U.S.C. 154(b) by 251 days.

(21) Appl. No.: 17/270,854

(22) PCT Filed: Jul. 16, 2019

(86) PCT No.: PCT/JP2019/027850
§ 371 (c)(1),
(2) Date: Feb. 23, 2021

(87) PCT Pub. No.: WO2020/039794
PCT Pub. Date: Feb. 27, 2020

(65) Prior Publication Data
US 2021/0240193 A1   Aug. 5, 2021

(30) Foreign Application Priority Data
Aug. 23, 2018   (JP) ................................. 2018-155966

(51) Int. Cl.
*G05D 1/00*   (2006.01)
*G05D 1/02*   (2020.01)
(Continued)

(52) U.S. Cl.
CPC ......... *G05D 1/0223* (2013.01); *E01C 19/004* (2013.01); *E01C 19/288* (2013.01); *G05D 2201/0202* (2013.01)

(58) Field of Classification Search
CPC .......... G05D 1/0223; G05D 2201/0202; E01C 19/004; E01C 19/288
(Continued)

(56) References Cited

U.S. PATENT DOCUMENTS

| 5,947,636 | A | * | 9/1999 | Mara | ....................... E01C 23/07 404/102 |
| 6,171,018 | B1 | | 1/2001 | Ohtomo et al. | |

(Continued)

FOREIGN PATENT DOCUMENTS

| DE | 112019004206 T5 * | 6/2021 | ............... G05D 1/02 |
| JP | S59111508 | 6/1984 | |

(Continued)

OTHER PUBLICATIONS

Notice of Reasons for Refusal issued by the JPO dated Mar. 29, 2022.

(Continued)

*Primary Examiner* — Raymond W Addie
(74) *Attorney, Agent, or Firm* — CRGO Global; Steven M. Greenberg

(57) ABSTRACT

A construction-vehicle autonomous travel control device to correct a steering angle so as to direct to a target point set on a target track includes: an expected arrival point calculator to calculate an expected arrival point of a vehicle to arrive after a predetermined time based on a vehicle speed and a steering angle; and a corrected steering angle calculator to calculate a corrected steering angle so as to direct the expected arrival point to the target point.

8 Claims, 16 Drawing Sheets

(51) Int. Cl.
*E01C 19/00* (2006.01)
*E01C 19/28* (2006.01)

(58) Field of Classification Search
USPC .............................. 404/84.05, 117
See application file for complete search history.

(56) References Cited

U.S. PATENT DOCUMENTS

| | | | | |
|---|---|---|---|---|
| 6,246,932 | B1* | 6/2001 | Kageyama | G05D 1/0297 |
| | | | | 701/50 |
| 6,292,725 | B1* | 9/2001 | Kageyama | G01S 19/49 |
| | | | | 180/169 |
| 8,142,103 | B2* | 3/2012 | Wolf | E01C 19/288 |
| | | | | 404/117 |
| 8,639,420 | B2* | 1/2014 | Corcoran | G06Q 10/063 |
| | | | | 701/50 |
| 2008/0208461 | A1* | 8/2008 | Gharsalli | G01C 21/32 |
| | | | | 701/425 |
| 2016/0054283 | A1* | 2/2016 | Stromsoe | E01C 19/236 |
| | | | | 73/488 |
| 2016/0170415 | A1* | 6/2016 | Zahr | G05D 1/0293 |
| | | | | 701/23 |
| 2019/0276992 | A1* | 9/2019 | Dahm | E01C 19/4893 |

FOREIGN PATENT DOCUMENTS

| | | |
|---|---|---|
| JP | H03233710 | 10/1991 |
| JP | H10212705 | 8/1998 |
| JP | H11236716 | 8/1999 |
| JP | 2002207516 | 7/2002 |
| JP | 2002339314 | 11/2002 |
| JP | 2008050859 A | 3/2008 |

OTHER PUBLICATIONS

International Search Report of PCT/JP2019/027850, dated Sep. 24, 2019.

* cited by examiner

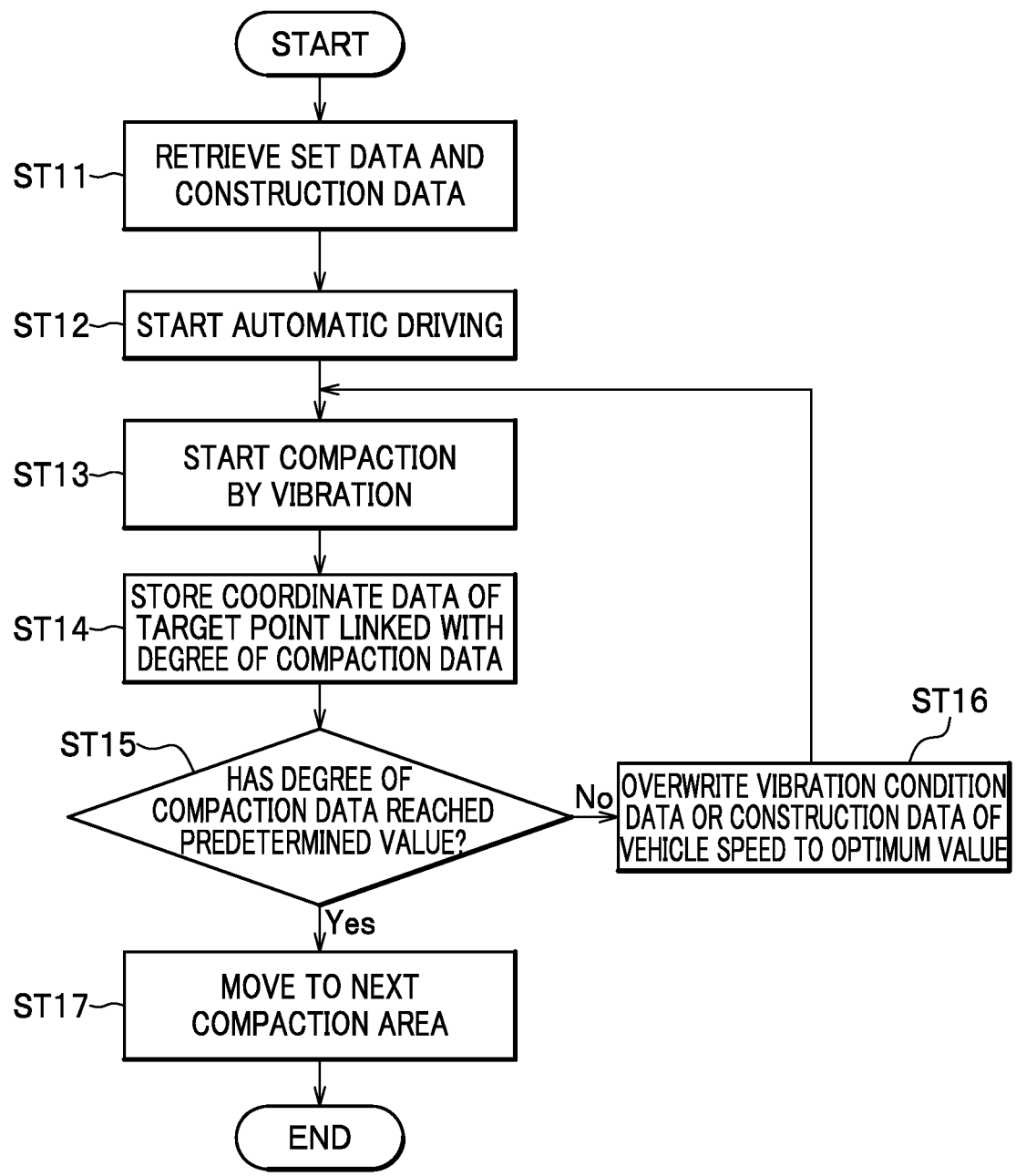

CONSTRUCTION-VEHICLE AUTONOMOUS TRAVEL CONTROL DEVICE

CROSS-REFERENCE TO RELATED APPLICATIONS

This application is a § 371 national phase entry of International Application No. PCT/JP2019/027850, filed Jul. 16, 2019, which claims priority to Japanese Patent Application No. 2018-155966, filed Aug. 23, 2018.

TECHNICAL FIELD

The present disclosure relates to a construction-vehicle autonomous travel control device.

BACKGROUND ART

When a compaction construction of the ground is performed with a vibrating roller or the like, the vibrating roller generally reciprocates on a predetermined lane. To obtain a uniform degree of compaction, it is necessary to accurately make a vehicle travel on the same lane so as to have the same drum overlap margins as much as possible. However, manual driving requires experience, and it is difficult to secure experienced operators due to a recent shortage of operators. To cope with this problem, there is a technique of making a vehicle autonomously travel to prevent position deviation of the vehicle without an operator (see Patent Document 1, for example).

CITATION LIST

Patent Literature

Patent Document 1: Japanese Patent Application Publication No. H10-212705

BRIEF SUMMARY

Technical Problem

A conventional autonomous travel vehicle travels toward a target point set on a target track, and after reaching the target point, the vehicle travels toward a next target point. However, with this structure, after the vehicle has reached the target point, a steering angle correction is made to control a direction toward the next target point. Therefore, a correction timing delays, and a value of the corrected steering angle becomes large, so that a travel trace of the vehicle becomes zigzag to have the vehicle likely deviated from the target track.

Further, as an example of quality control method for a degree of compaction of the ground, there is a vibrating roller mounted with a compaction management device using the acceleration response method. An operator of the vibrating roller grasps a compaction situation by checking a monitor of the compaction management device to determine a vibration condition, a vehicle speed, or number of passes based on the situation. However, determining the vibration condition or the traveling times by an operator still requires experience. Therefore, an autonomous travel vehicle is desired to be capable of automatically managing the degree of compaction of the ground without an operator.

The present disclosure is directed to solve such a problem described above, and an object thereof is to provide a construction-vehicle autonomous travel control device capable of preventing a position deviation of a vehicle with respect to a target track.

Further, another object of the present disclosure is to provide a construction-vehicle autonomous travel control device capable of easily linking autonomous traveling of a vehicle with compaction management of the ground.

Solution to Problem

To achieve the objectives described above, a construction-vehicle autonomous travel control device to correct a steering angle so as to direct toward a target point set on a target track includes: an expected arrival point calculator to calculate an expected arrival point of a vehicle to arrive after a predetermined time based on a vehicle speed and a steering angle; and a corrected steering angle calculator to calculate a corrected steering angle so as to direct the expected arrival point to the target point.

The expected arrival point of the vehicle to arrive after a predetermined time is directed to the target point so that sudden correction of a steering angle is prevented to have a smooth travel trace of the vehicle, compared with a case where the vehicle itself is directed toward the target point. The expected arrival point is an estimated point to arrive after a predetermined time in consideration of the vehicle speed, so that the position of the expected arrival point is also changed in response to a change in the vehicle speed. Therefore, any complicated feed-forward control is not required but effects equivalent to those therefrom are obtained to achieve highly accurate autonomous driving.

Further, the corrected steering angle calculator calculates the corrected steering angle so as to direct the expected arrival point to a next target point when the expected arrival point has approached within a predetermined distance from the target point.

The corrected steering angle is repeatedly calculated with simple calculation processing.

Further, a target circle is set about the expected arrival point, and the corrected steering angle calculator calculates the corrected steering angle so as to direct the expected arrival point to a target point outside the target circle.

In the case where the expected arrival point is directed to the target point outside the target circle, the expected arrival point is directed to a distant target point. In comparison with the case where the expected arrival point is directed to the closest target point, sudden correction of the steering angle is prevented, and the vehicle travels on a smooth straight track along a straight target track. There is no need to increase a distance between the target points so that the straight track of the vehicle between target points hardly deviates from the straight track of the vehicle between the next target points.

Further, the structure to set the target circle allows the expected arrival point to be easily directed to the next target point by having the target radius as a compared factor, regardless of a vehicle orientation, to have no complicated calculation processing required. The target circle is about the expected arrival point whose position varies in response to the vehicle speed, so that the position of the target circle also varies in response to the vehicle speed. Therefore, any complicated feed-forward control is not required but effects equivalent to those therefrom are obtained.

Further, a radius of the target circle is variably set to be large when the target track is a straight track or a curved track having a large radius of curvature, and to be small when the target track is a curved track having a small radius of curvature.

The present disclosure allows a vehicle both to travel straight and to travel curvedly.

Further, the construction-vehicle is a compactor to compact a ground with a drum, and the expected arrival point is calculated based on a center point of the drum.

It is important for autonomous driving of a compactor to accurately manage a compaction range by a drum. The compaction range after the traveling is accurately controlled by calculating the expected arrival point based on the center point of the drum.

Further, a link storage is provided which stores coordinate data of the target point linked with construction data.

Generally, an autonomous travel vehicle retrieves coordinate data of a target point from map data into autonomous drive software for traveling. Therefore, by storing the coordinate data linked with the construction data, general-purpose autonomous drive software is almost used as it is, to reflect the construction data onto a construction area.

Further, the construction-vehicle autonomous travel control device of the present disclosure, to correct the steering angle so as to direct the target point set on the target track, includes a link storage storing coordinate data of the target point linked with construction data.

Further, the construction data includes track data of the target track.

The construction data includes the track data of the target track so that the autonomous travel vehicle travels smoothly.

Further, a vibrator to vibrate a rolling pressure wheel to compact a ground and a degree of compaction detector to detect a degree of compaction of the ground are provided in a vehicle, and the construction data includes vibration condition data of the vibrator and degree of compaction data detected by the degree of compaction detector.

Autonomous traveling of the vehicle and compaction management of the ground are easily linked with each other, to stabilize the quality of the degree of compaction and to improve the efficiency of compaction.

Further, when the vehicle reciprocates on the target track, the vibration condition data is changed for a next traveling based on a degree of compaction for every target point stored at a previous traveling.

Still further, when the vehicle reciprocates on the target track, a vehicle speed is changed for a next traveling based on a degree of compaction for every target point stored at a previous traveling.

Compaction of the ground is managed with simple calculation processing.

Advantageous Effects

With the construction-vehicle autonomous travel control device, position deviation of a vehicle with respect to a target track is prevented.

Further, autonomous traveling of the vehicle is easily linked with compaction management of the ground.

BRIEF DESCRIPTION OF THE DRAWINGS

FIG. 17 is a flowchart of a compaction management procedure.

DESCRIPTION OF EMBODIMENTS

First Embodiment

Figure 2:
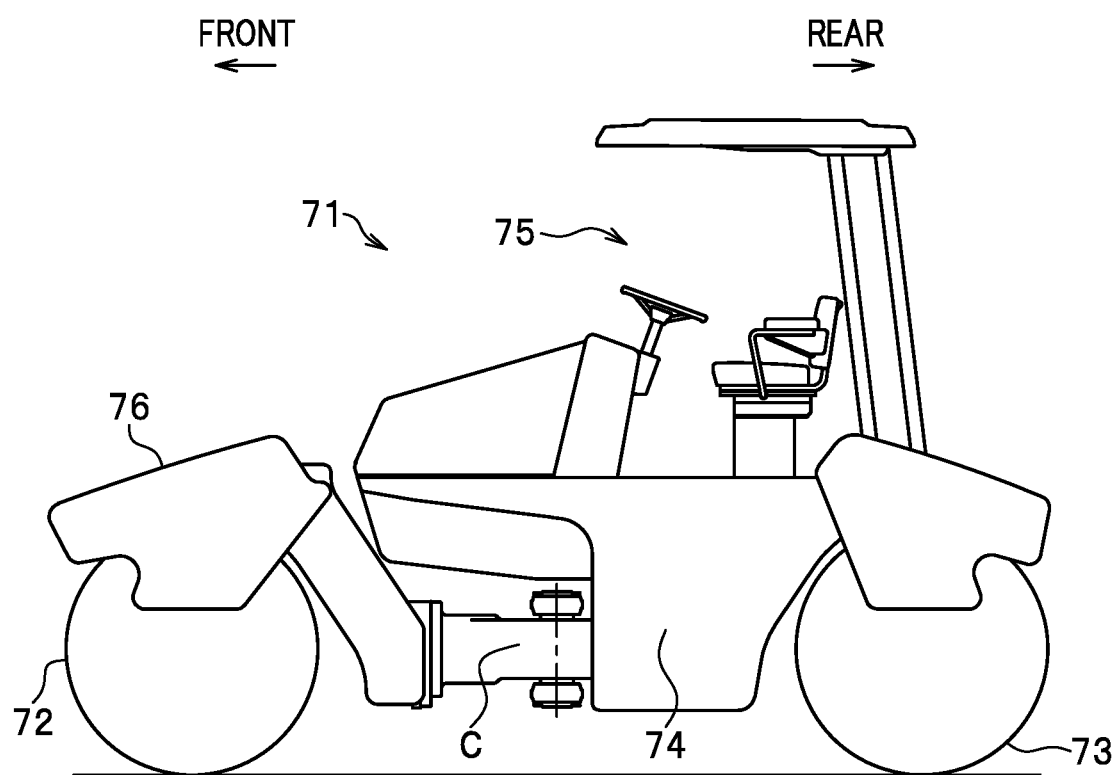
FIG. 2 is a side view of a compactor.

A description will be given of a case where a vehicle is a compactor. FIG. 2 illustrates a double drum roller (tandem roller) 71 which is a compactor to compact an asphalt pavement or the like with drums and is capable of performing compaction construction by rolling forward and rearward. The double drum roller 71 includes a front drum 72 on the front wheel side, a rear drum 73 on the rear wheel side as rolling pressure wheels, and a driver seat 75 arranged on a vehicle body 74. The double drum roller 71 described above is in an articulated type, in which the rear drum 73 is pivotally attached to the vehicle body 74, and the front drum 72 is pivotally attached to a yoke 76 coupled to the vehicle body 74 via a center pin C. The vehicle body 74 and the yoke 76 are turned with respect to each other by a hydraulic cylinder (not shown), for example, about the center pin C as a pivot point for steering control of the vehicle, that is, steering angle control.

Figure 1:
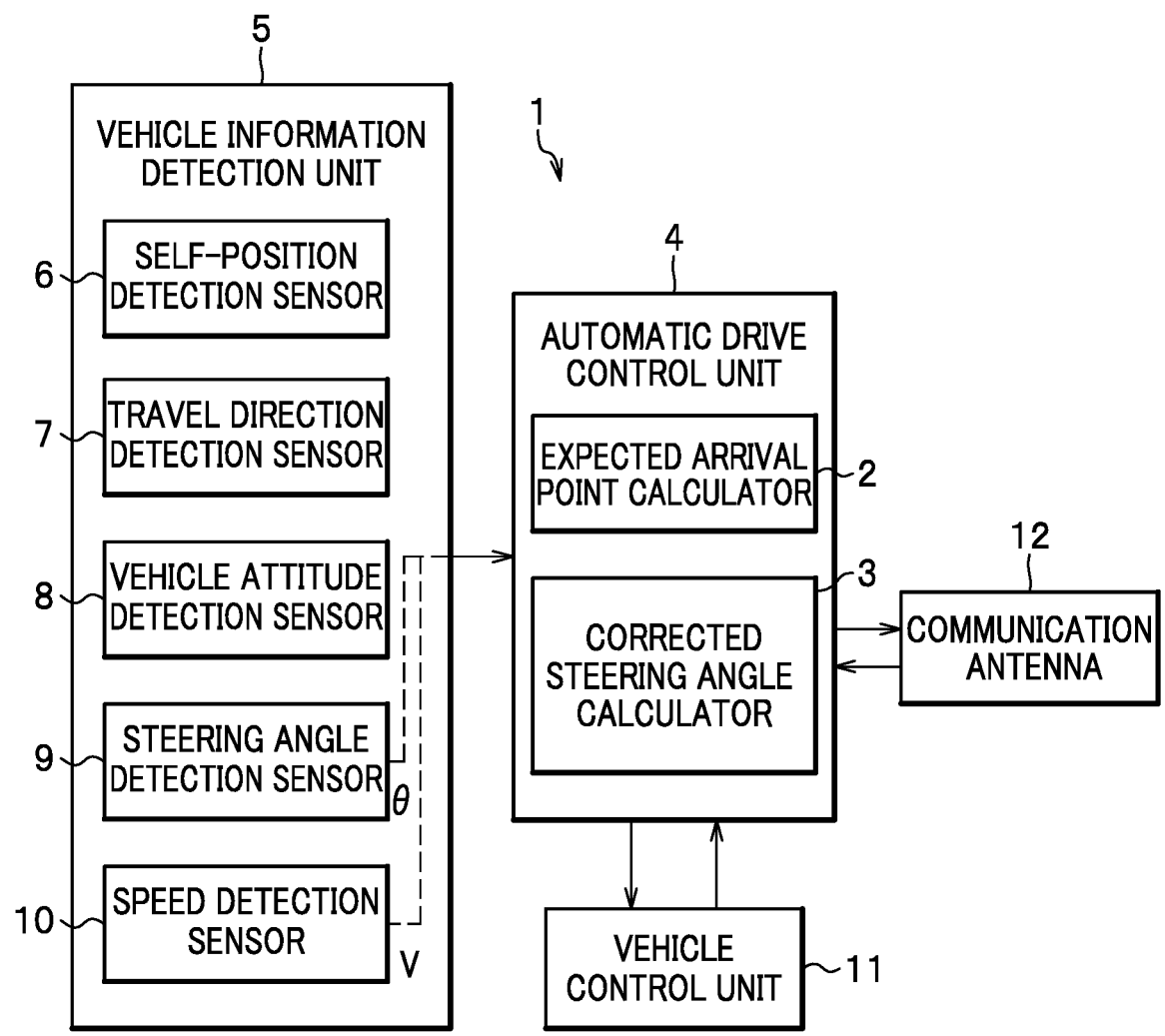
FIG. 1 is a block diagram of a structure of an autonomous travel control device of a first embodiment.

In FIG. 1, an autonomous travel control device 1 is a device to correct a steering angle of the vehicle toward a target point set on a target track and includes an automatic drive control unit 4 including a CPU, a memory, and the like. The automatic drive control unit 4 is arranged in the vicinity of the driver seat 75 illustrated in FIG. 2, for example.

The automatic drive control unit 4 sends a control signal to a vehicle control unit 11 based on sensor information from a vehicle information detection unit 5 to control automatic driving of the vehicle. The vehicle control unit 11 includes an engine, a hydraulic device for rolling, a steering device, and the like. Further, the automatic drive control unit 4 is connected with a host computer (not shown) through wireless communication via a communication antenna 12, to exchange self-position correction data, information on automatic drive control, vehicle control, travel map, rolling pressure conditions, and other vehicle information.

The vehicle information detection unit 5 includes a self-position detection sensor 6, a travel direction detection sensor 7, a vehicle attitude detection sensor 8, a steering angle detection sensor 9, and a speed detection sensor 10.

The self-position detection sensor 6 is a sensor to detect a current position of the vehicle and may employ positioning systems such as a global navigation satellite system (GNSS) and a total station.

The travel direction detection sensor 7 is a sensor to detect a travel direction (forward direction, rearward direction) of the vehicle and employs two GNSSs to obtain an accurate travel direction. Instead, a gyro sensor or an acceleration sensor may be employed.

The vehicle attitude detection sensor 8 is a sensor to detect an inclined attitude of the vehicle and may employ an inclination sensor, or instead, a gyro sensor or an acceleration sensor.

The steering angle detection sensor 9 is a sensor to detect a steering angle θ and may employ a cylinder position measurement sensor arranged on the hydraulic cylinder described above, or a rotation angle sensor or the like arranged on the center pin C.

The speed detection sensor 10 is a sensor to detect a vehicle speed V and is a rotary encoder to detect a rotation speed of a hydraulic motor for rolling, for example.

The automatic drive control unit 4 includes an expected arrival point calculator 2 and a corrected steering angle calculator 3.

[Expected Arrival Point Calculator 2]

Figure 3:
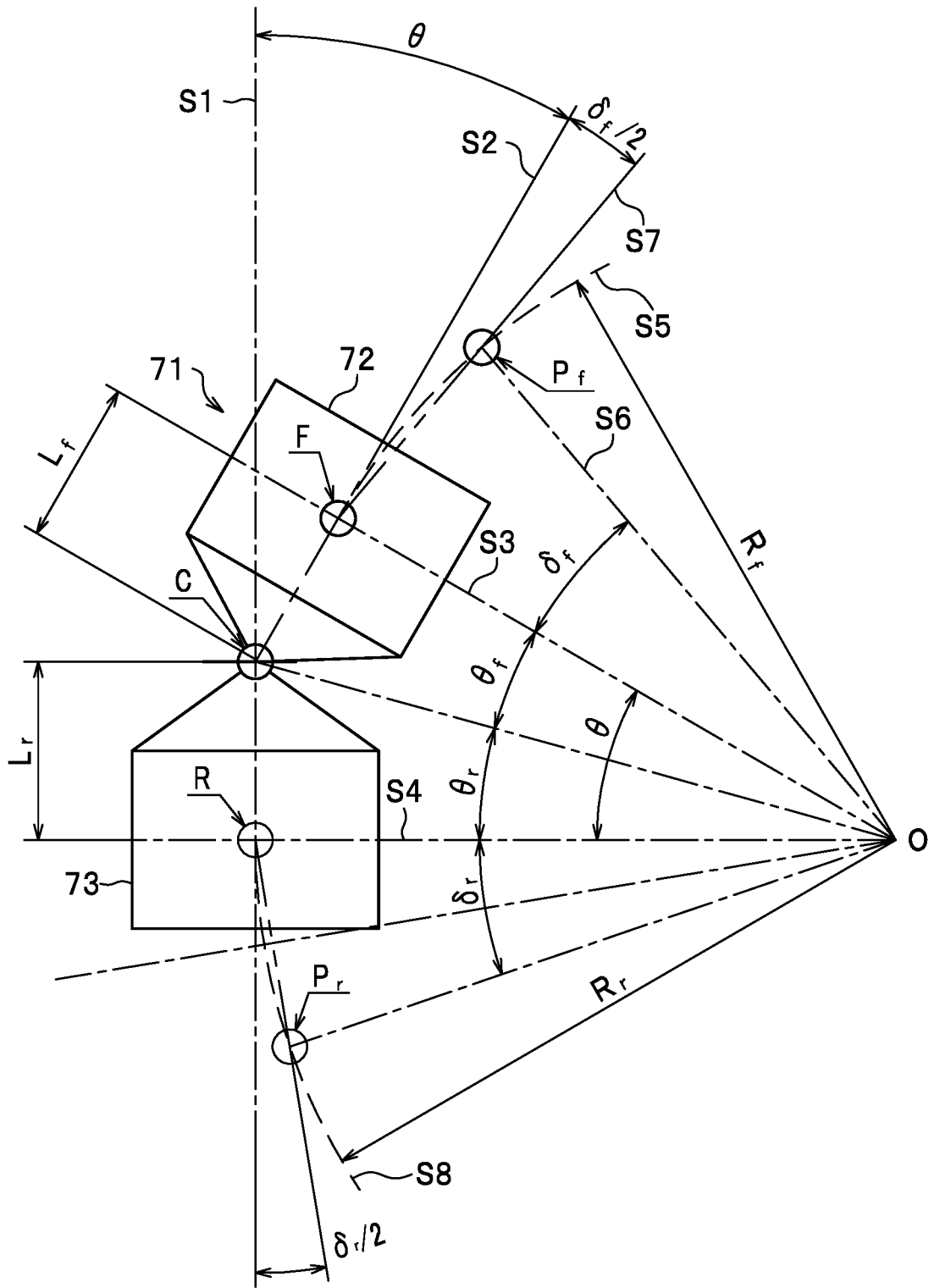
FIG. 3 is a diagram illustrating a procedure of calculating an expected arrival point in the first embodiment when the compactor is viewed in a planar view.

The expected arrival point calculator 2 calculates an expected arrival point Pf of the vehicle to arrive after a predetermined time as illustrated in FIG. 3, based on the vehicle speed V detected by the speed detection sensor 10 and the steering angle θ detected by the steering angle detection sensor 9. It is important for a compactor such as a double drum roller to accurately control a compaction range by the drums, so that a drum position is preferably set as a reference of a vehicle position. Therefore, the expected arrival point Pf of the vehicle is preferably calculated, with the center point of the drum as a reference point. Hereinafter, a description will be given of a case where the expected arrival point Pf is calculated, with the center point of the front drum 72 as a reference point, when the vehicle travels forward.

FIG. 3 illustrates a symbol C indicating an articulated center point, that is, the center pin C illustrated in FIG. 2, a symbol F indicating the drum center point of the front drum 72, and a symbol R indicating the drum center point of the rear drum 73. The distance between the center pin C and a drum center point F is defined as Lf, and the distance between the center pin C and the drum center point R is defined as Lr. The steering angle θ is an intersection angle defined by a direct advance line of direction S1 of the vehicle and a front drum line of direction S2 passing through the center pin C and the drum center point F, and is also the intersection angle defined by an axis S3 of the front drum 72 and an axis S4 of the rear drum 73. The intersection point between the axis S3 and the axis S4 is defined as a rotation center O.

Now, when the double drum roller 71 is moving forward with the steering angle θ, the vehicle is traveling in a curve. Therefore, the expected arrival point Pf needs to be set on a curved track S5 of the front drum 72, having the rotation center C as a center, rather than on the front drum line of direction S2. A rotation radius Rf of the curved track S5 is calculated as follows.

At first, assuming that a front angle, between the center pin C and the drum center point F, of the steering angle θ is defined as θf, the angle θf is obtained as follows:

$$\theta f = k \times \theta \quad \text{Equation (1)}$$

where k is a coefficient determined by a ratio of the distance Lf to the distance Lr. When the distance Lf is equal to the distance Lr, the front angle θf becomes equal to a rear angle θr.

The rotation radius Rf is obtained as follows:

$$Rf = Lf/\tan(\theta f) \quad \text{Equation (2)}.$$

When the expected arrival point Pf of the drum center point F to arrive after t seconds is set on the curved track S5 having the rotation radius Rf obtained as described above, an angle δf is calculated as follows for setting the expected arrival point Pf:

$$\delta f = (V \times t)/Rf \quad \text{Equation (3)}$$

where the angle δf is an intersection angle between a diameter S6 passing through the rotation center O and the expected arrival point Pf and the axis S3 of the front drum 72, V is a vehicle speed, and t is time.

Specifically, an intersection between a line S7 and the curved track S5 is set as the expected arrival point Pf. The line S7 intersects the curved track S5 at an angle of "δf/2" radially inward about the drum center point F with respect to the front drum line of direction S2.

As is obvious from Equation (3), the expected arrival point Pf varies depending on the vehicle speed V. That is, the faster the vehicle speed V is, the farther the expected arrival point Pf is positioned from the drum center point F. The time t in Equation (3) is a value appropriately set based on a response speed of a steering mechanism, a width dimension of the vehicle, a longitudinal dimension of the vehicle, a road surface condition, or the like. The time t may be fixed or may be variable depending on the road surface condition, the value of the rotation radius Rf, or the like.

Further, when the vehicle travels backward, an expected arrival point Pr is set on a curved track S8 based on an angle δr calculated in the same manner as the vehicle travels forward, using the drum center point R of the rear drum 73 as a reference point.

[Corrected Steering Angle Calculator 3]

A description will be given of the corrected steering angle calculator 3 with reference to FIG. 4.

<Case of Straight Traveling>

Figure 4:
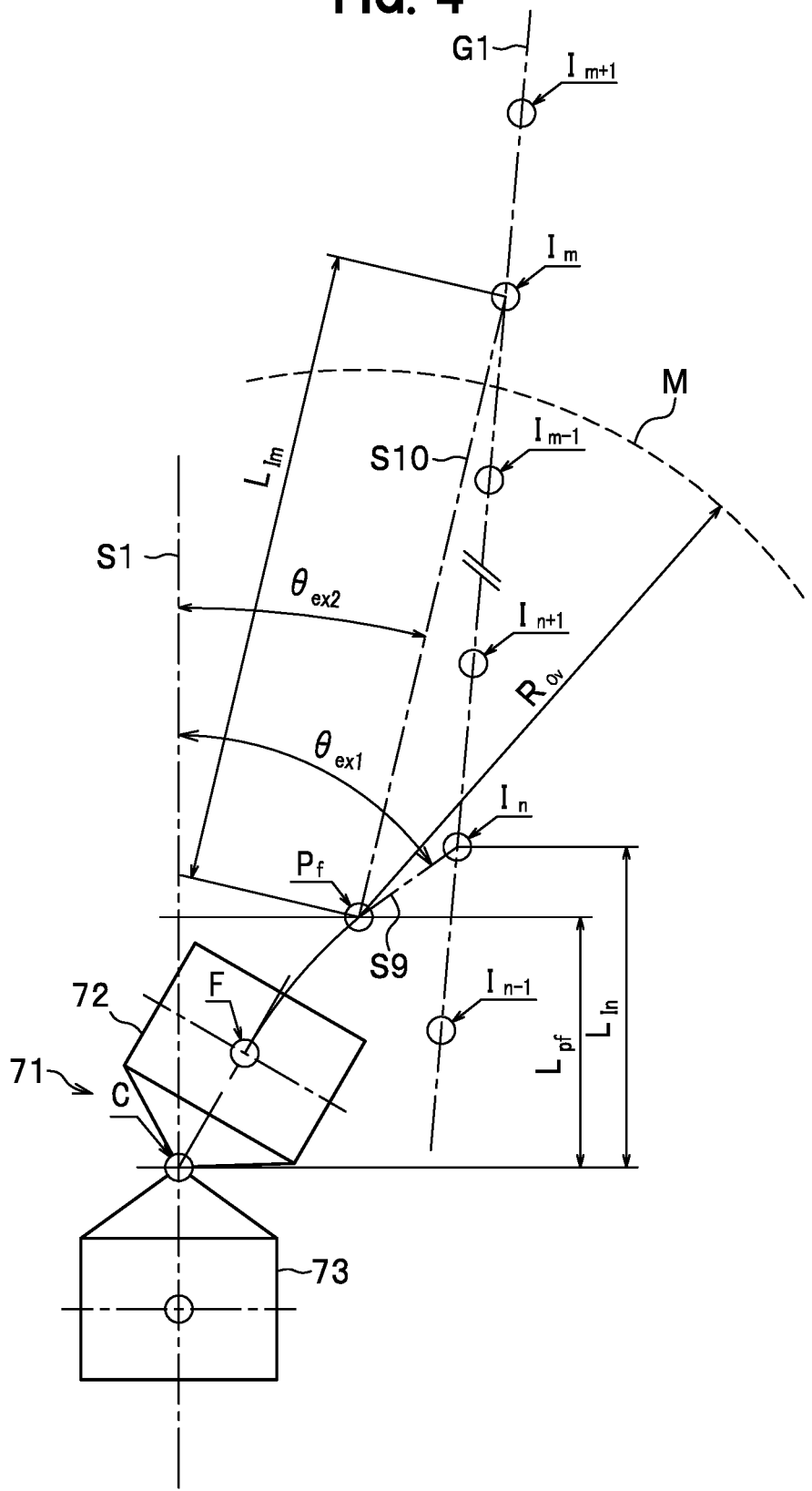
FIG. 4 is a diagram illustrating a procedure of calculating a corrected steering angle with respect to a straight target track in the first embodiment when the compactor is viewed in a planar view.

FIG. 4 is a diagram illustrating a case in which the vehicle travels linearly along a straight target track G1. The corrected steering angle calculator 3 calculates a corrected steering angle θex so as to direct the expected arrival point Pf to a target point I on the target track G1 in the shortest distance.

A plurality of target points In−1, In, In+1 are set at intervals on the target track G1. The coordinates of respective target points are obtained by the global navigation satellite systems (GNSS) or the like for example, or are calculated based on the systems. A case is described, in which the vehicle travels from the expected arrival point Pf to the target point In which is the closest position in the forward direction. The corrected steering angle calculator 3 calculates an intersection angle between a line S9 connecting the expected arrival point Pf with the target point In and the direct advance line of direction S1 of the vehicle as a corrected steering angle θex1. Then, a distance LPf along the direct advance line of direction S1 of the vehicle between the center pin C and the expected arrival point Pf is calculated, and a distance LIn along the direct advance line of direction S1 of the vehicle between the center pin C and the target point In is calculated. When "LPf≥LIn" is satisfied, the corrected steering angle calculator 3 calculates the new corrected steering angle θex so as to direct the expected arrival point Pf to the next target point In+1. That is, the expected arrival point Pf is directed to the next target point In+1 when having approached within a predetermined distance from the target point In. Then, this processing is repeated, and the automatic drive control unit 4 sends a correction signal for a steering angle to the steering device in the vehicle control unit 11, in FIG. 1, based on the corrected steering angle θex.

As described above, the automatic drive control unit 4 includes the expected arrival point calculator 2 to calculate the expected arrival point Pf of the vehicle to arrive after a predetermined time, based on the vehicle speed V and the steering angle θ, and the corrected steering angle calculator 3 to calculate the corrected steering angle θex so as to direct the expected arrival point Pf to the target point I. Therefore, the following effects are obtained.

The expected arrival point Pf of the vehicle to arrive after a predetermined time is directed toward the target point I so that sudden correction of the steering angle is prevented to have a smooth travel trace of the vehicle, as compared with a case where the vehicle itself is directed to the target point I. The expected arrival point Pf is an estimated point to arrive after a predetermined time in consideration of the vehicle speed V, so that the position of the expected arrival point Pf is also changed in response to a change in the vehicle speed V. Therefore, any complicated feed-forward control is not required but effects equivalent to those therefrom are obtained to achieve highly accurate autonomous driving.

Here, in a case of the vehicle traveling along the straight target track G1, if the expected arrival point Pf is always directed to the closest target point I in the forward direction, a correction degree of the corrected steering angle θex becomes relatively large, to have a problem that a straight track of the vehicle is likely to slightly become zigzag with respect to the target track G1. The reason may include an error between an actual travel direction of the vehicle and a travel direction detected by the travel direction detection sensor 7, and a change in the correction speed of the steering device in association with load fluctuation due to a road condition. If a distance between the target points I is increased, the expected arrival point Pf is directed to a single distant target point I for a while, so that it is considered that a zigzag track becomes even. However, meanwhile, if the distance between the target points I is increased, there may be a problem that a straight track of the vehicle between the target points I may deviate from a straight track of the vehicle between the next target points I.

To solve the problem, a target circle M is set about the expected arrival point Pf, and the corrected steering angle calculator 3 calculates the corrected steering angle θex to direct the expected arrival point Pf to a target point I outside the target circle M. The target circle M may be an arc instead. In FIG. 4, the target circle M of a target radius ROv about the expected arrival point Pf is set, to have the target points In, In+1, Im−1 located inside the target circle M, and target points Im, Im+1 located outside the target circle M, as target points I located in front of the expected arrival point Pf. The corrected steering angle calculator 3 skips calculation for the target points In, In+1, Im−1, and calculates an intersection angle between a line S10 connecting the expected arrival point Pf with the target point Im and the direct advance line of direction S1 of the vehicle, as a corrected steering angle δex2 so as to direct the expected arrival point Pf to the target point Im, closest to the point Pf, of the target points Im and Im+1 outside the target circle M. Assuming that a distance between the expected arrival point Pf and the target point Im is LIm, when "ROv≥Lim" is satisfied, the corrected steering angle calculator 3 calculates a new corrected steering angle θex so as to direct the expected arrival point Pf to the next target point Im+1. Then the processing is repeated.

A value of the target radius ROv is appropriately set based on the response speed of the steering mechanism, the width dimension of the vehicle, the longitudinal dimension of the vehicle, the road condition, or the like.

As described above, in the case where the expected arrival point Pf is directed to the target point I outside the target circle M, the expected arrival point Pf is directed to the distant target point I. In comparison with the case where the expected arrival point Pf is directed to the closest target point I, sudden correction of the steering angle is prevented, and the vehicle travels on a smooth straight track along the straight target track G1. There is no need to increase the distance between the target points I so that the straight track of the vehicle between the target points I hardly deviates from that between the next target points I.

Further, the structure to set the target circle M allows for easily directing the expected arrival point Pf to the next target point I only by comparison of the target radius ROv with the distance LIm, regardless of a vehicle orientation, to have no complicated arithmetic processing required. The target circle M has the expected arrival point Pf as a center point whose position varies in response to the vehicle speed V, so that the position of the target circle M also varies in response to the vehicle speed V. Therefore, any complicated feed-forward control is not required but effects equivalent to those therefrom are obtained to achieve highly accurate autonomous driving.

<Case of Curved Traveling>

Figure 5:
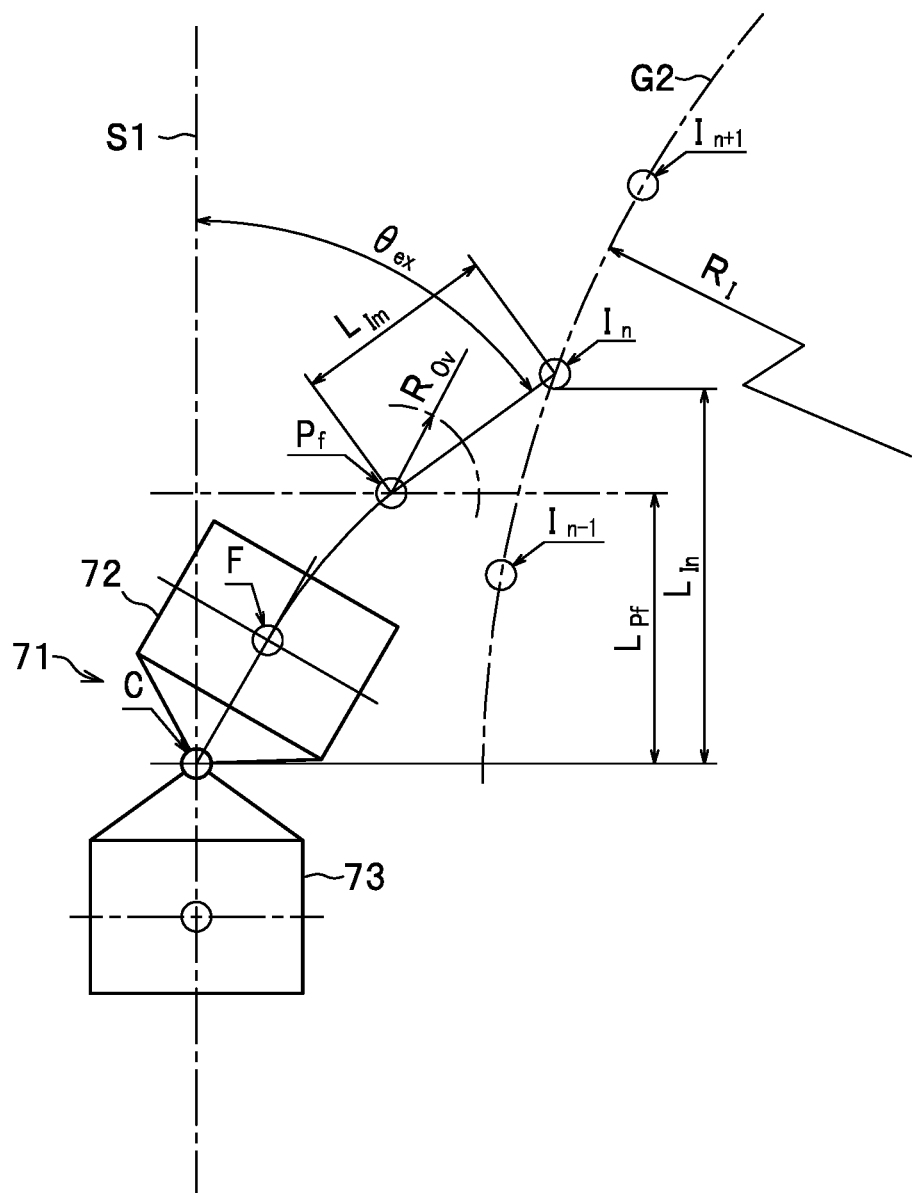
FIG. 5 is a diagram illustrating a procedure of calculating a corrected steering angle with respect to a curved target track in the first embodiment when the compactor is viewed in a planar view.

With reference to FIG. 5, a description will be given of a case in which the vehicle travels curvedly along a curved target track G2. A plurality of target points In+1, In, In−1 are set at intervals on the curved target track G2. Even during the curved traveling, the processing of calculating the corrected steering angle θex by the expected arrival point calculator 2 and the corrected steering angle calculator 3 is the same as in the straight traveling. The difference in the curved traveling is that the target radius ROv has a smaller value than that in the straight traveling at the time of setting the target circle M. That is, the target radius ROv is variably set to be large when the target track G1 is straight as illustrated in FIG. 4, and to be small when the target track G2 is curved as illustrated in FIG. 5.

If the value of the target radius ROv is set large in the case of the curved target track G2, the expected arrival point Pf is directed to a more distant target point I over the large target radius ROv, so that the vehicle does not travel curvedly along the target track G2, but travels linearly. Therefore, in the case of the curved target track G2, the value of the target radius ROv is made smaller than the distance between the target points I, and, as illustrated in FIG. 5, the expected arrival point Pf is directed to the target point In, which is located at a position outside the target circle M and closest to the point Pf in the forward direction. When "LPf≥LIn" or "ROv≥Lim" is satisfied, the expected arrival point Pf is directed to the next target point In+1. As described above, trackability of the vehicle to the curved target track G2 is improved. In the case of curved traveling, the steering angle of the vehicle is generally large, and even if the steering angle is suddenly corrected, a travel track is not so disturbed as in the case of the straight target track G1.

Note that, when a radius of curvature RI of the target track G2 is large as with a linear track, the value of the target radius ROv may be increased as in the case of straight traveling in FIG. 4, and the target radius ROv may be changed in accordance with the value of the radius of curvature RI. Further, depending on a case, when the target track is straight or has a large radius of curvature, a function of the target circle M is activated to direct the expected arrival point Pf to a distant target point I, and, when a radius of curvature of the target track is small, the function of the target circle M is deactivated to direct the expected arrival point Pf to the closest target point I.

Figure 6:
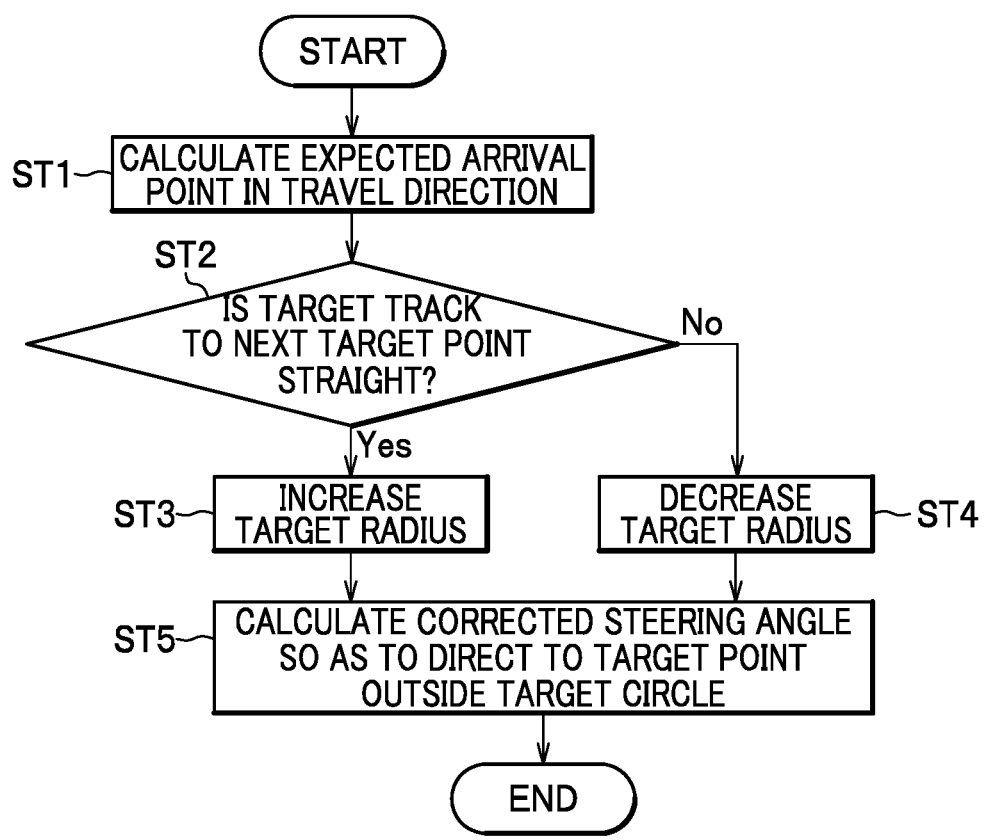
FIG. 6 is a flowchart of a procedure of calculating the expected arrival point and the corrected steering angle.

FIG. 6 is a flowchart of a procedure of calculating the expected arrival point Pf and the corrected steering angle θex described above. In step ST1, the expected arrival point calculator 2 calculates the expected arrival point Pf in the travel direction, and, in step ST2, the automatic drive control unit 4 determines whether the target track to a next target point I is straight (including a curved track having a large radius of curvature similar to a straight track). The determination whether the target track is "straight" or "curved" may be made by retrieving data stored in advance for every target point I or by an inclination between target points I which is obtained at the time of traveling.

If step ST2 is Yes, the target radius ROv is increased in step ST3, and if it is No, the target radius ROv is decreased in step ST4. Next, in step ST5, the corrected steering angle calculator 3 calculates the corrected steering angle θex so as to direct the expected arrival point Pf to a target point I outside the target circle M.

Second Embodiment

In the first embodiment, the double drum roller having two drums is exemplified as a vehicle in question, while in the second embodiment, a single drum roller having a drum only at one of the front wheel and the rear wheel is exemplified. The single drum roller is a compactor to be often used for construction such as soil compaction.

Figure 7:
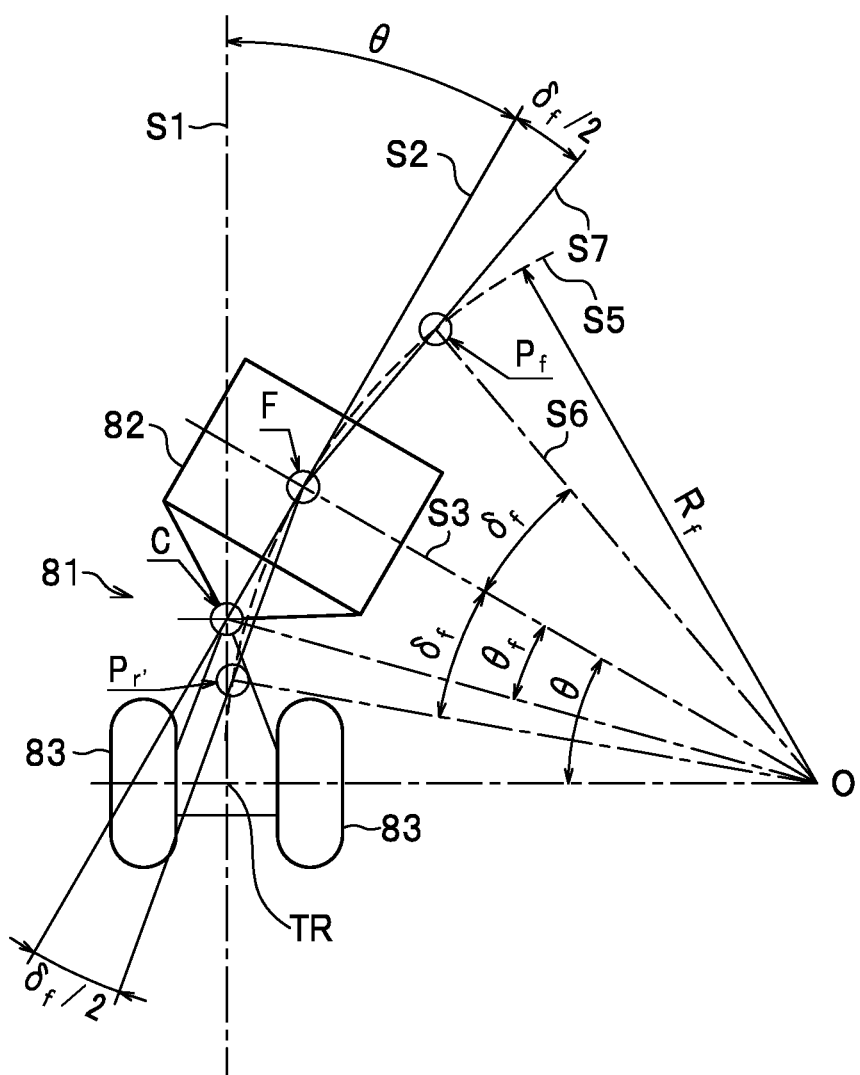
FIG. 7 is a diagram illustrating a procedure of calculating an expected arrival point in a second embodiment when the compactor is viewed in a planar view.

FIG. 7 schematically illustrates a single drum roller 81. The single drum roller 81 includes a drum 82 on the front wheel and a pair of tires 83 on the rear wheels. Only the drum 82 contributes to compaction. With the single drum roller 81, if an expected arrival point of the rearward traveling is calculated, using an axis center point TR of the tires 83 as a reference point, the expected arrival point tends to deviate from the curved track S5 of the drum 82 contributing to compaction. As described above, it is important for a compactor to accurately manage a compaction range by a drum, and it is preferable to set a reference of vehicle position to a position of the drum. Therefore, in the case of the single drum roller 81, it is preferable to calculate the expected arrival point Pf for forward traveling and an expected arrival point Pr' for rearward traveling, using the drum center point F of the identical drum 82 as a reference point. Thus, both the expected arrival point Pf for forward traveling and the expected arrival point Pr' for rearward traveling are set on the curved track S5 of the drum 82. The calculation method of the expected arrival point Pf and the expected arrival point Pr' other than those described above is the same as that of the first embodiment, and the subsequent processing of the corrected steering angle calculator 3 is also the same as that of the first embodiment, so that the descriptions thereof are omitted.

[Test Results]

Figure 8:
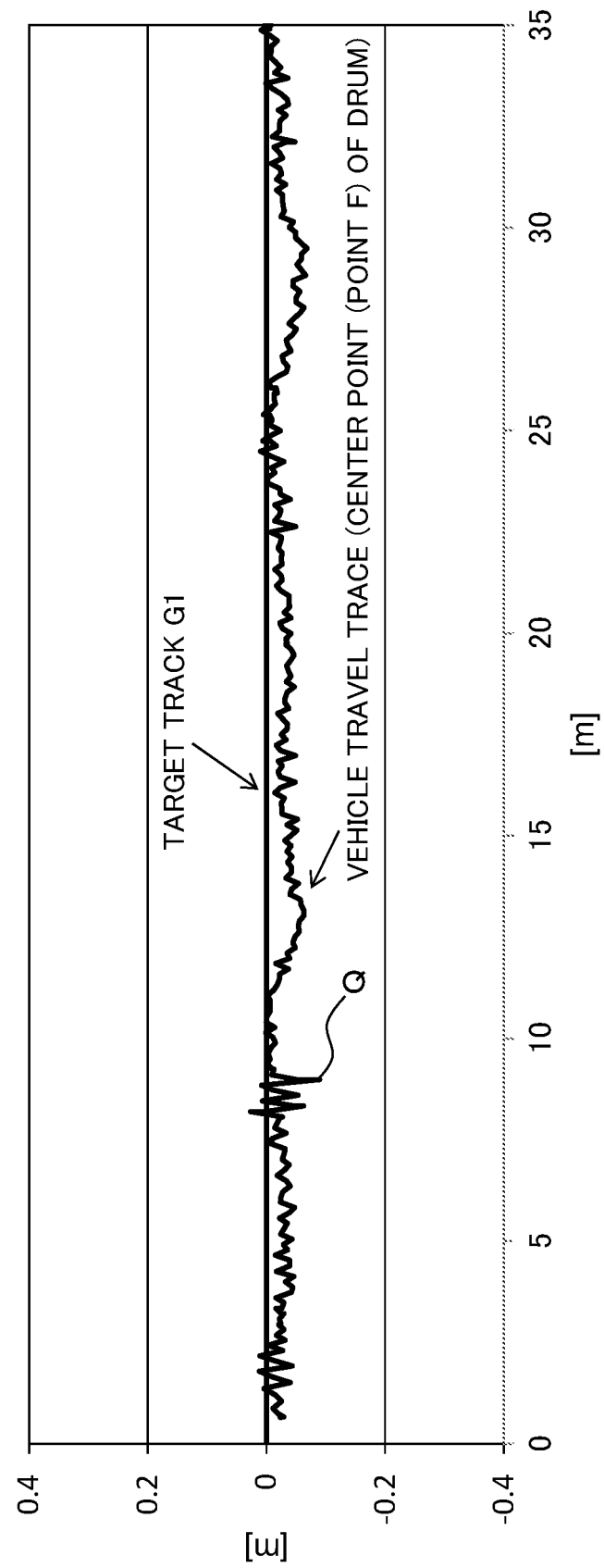
FIG. 8 is a graph when the compactor is tested to travel along a straight target track.
Figure 9:
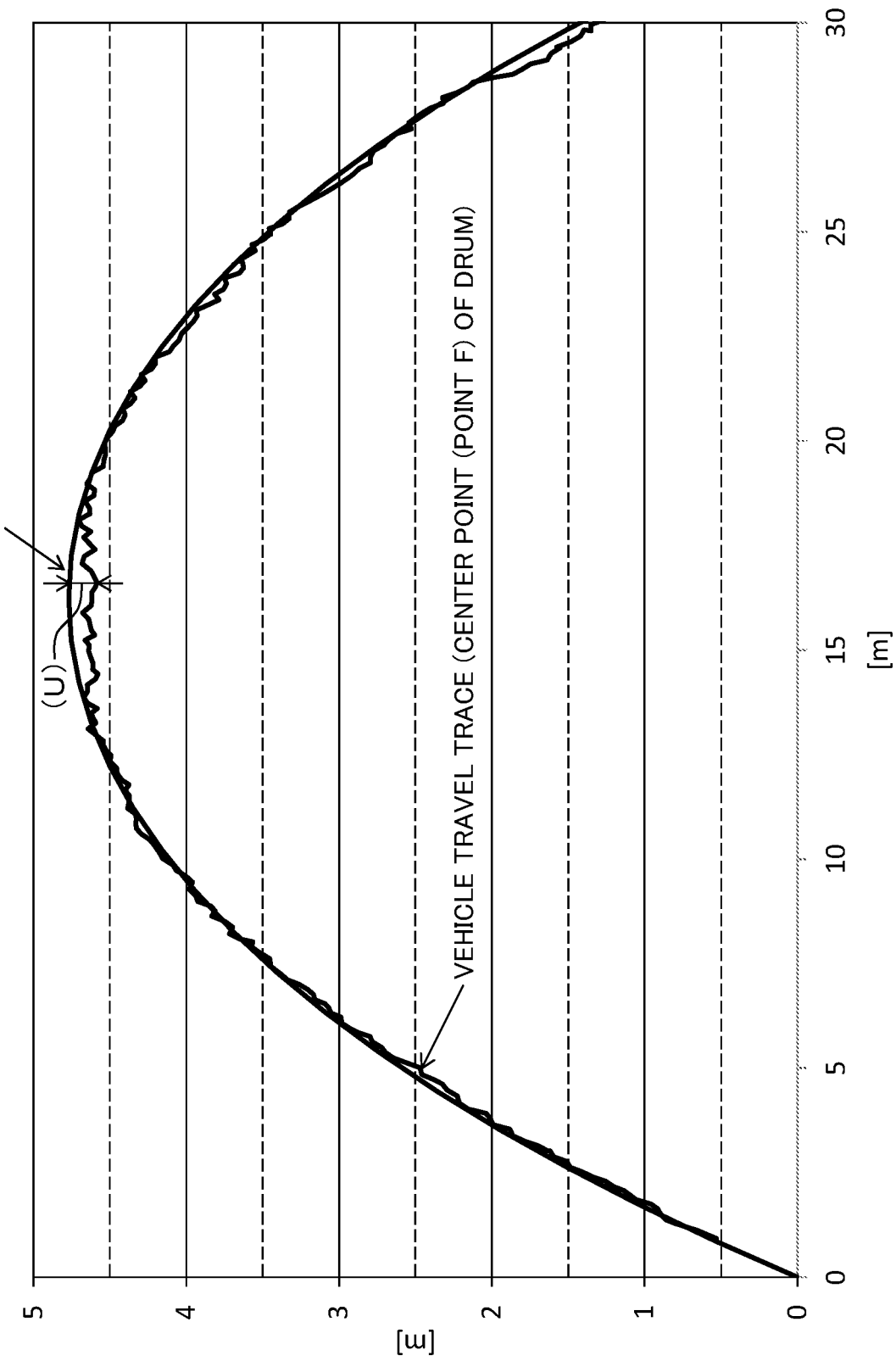
FIG. 9 is a graph when the compactor is tested to travel along a curved target track.

FIGS. 8 and 9 are graphs of test results in which the vehicle has traveled by executing the expected arrival point calculator 2 and the corrected steering angle calculator 3 of the present disclosure. In the test traveling in FIG. 8, a single drum roller for construction was rolled straight in a forward mode at a traveling speed of 2 km/h on a flat portion of an asphalt road. In the test traveling in FIG. 9, the single drum roller for construction was rolled curvedly in the forward mode at a traveling speed of 3 km/h on an uneven portion of a soil.

As illustrated in FIG. 8, a vehicle travel trace only deviated about 10 cm from the target track G1 even at the maximum deviated point Q, and overall fell substantially within a deviation range of approximately 10 cm. Therefore, it was confirmed that a highly accurate travel trace was obtained with respect to the straight target track G1. In the curved traveling, as illustrated in FIG. 9, the maximum deviated width U was about 20 cm at a portion having the smallest curvature on the target track G2. The test in FIG. 9 was traveling on the uneven soil, and it was confirmed that a highly accurate travel trace was also obtained, in consideration of a significant inclination of a vehicle attitude.

Third Embodiment

Figure 10:
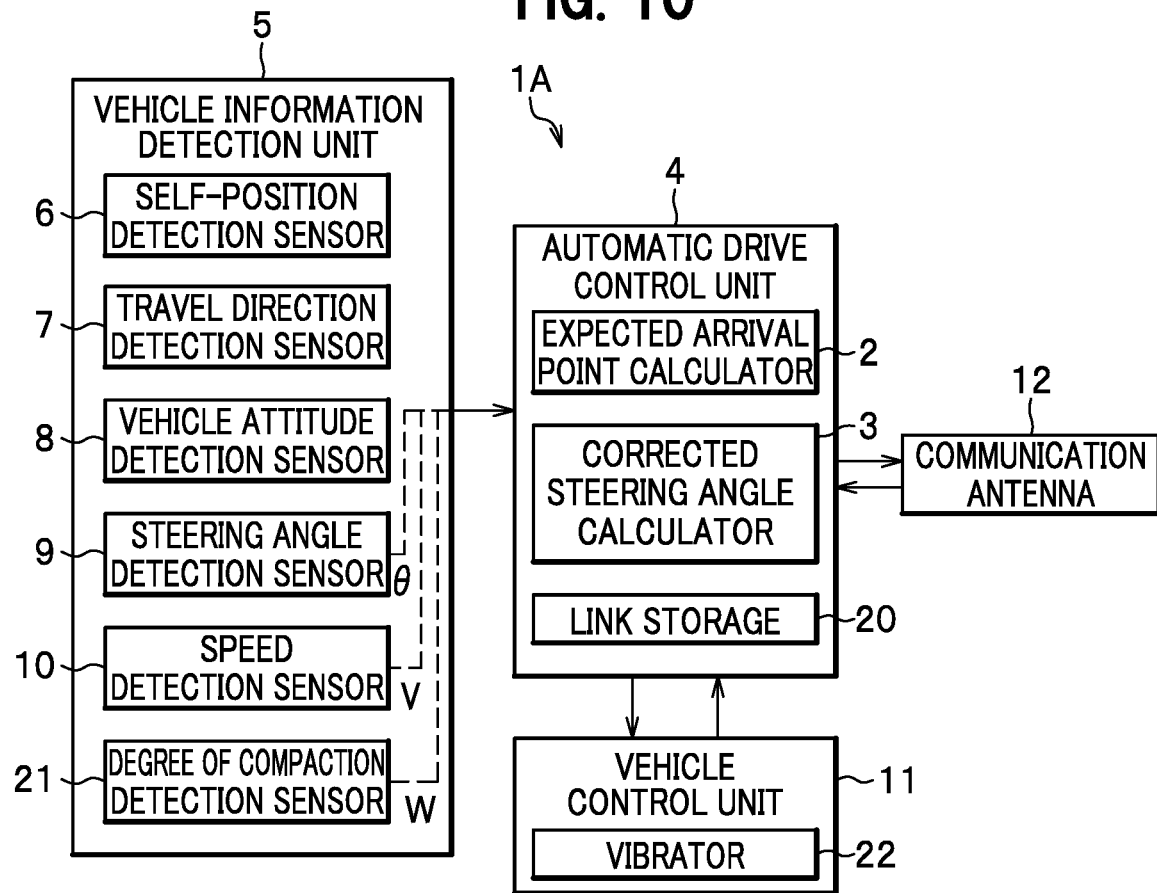
FIG. 10 is a block diagram of a structure of an autonomous travel control device of a third embodiment.

An autonomous travel control device 1A of a third embodiment in FIG. 10 includes a link storage 20 in the automatic drive control unit 4. The same components as those in FIG. 1 of the first embodiment are denoted by the same symbols, and the descriptions thereof will be omitted. Note that the third embodiment is characterized by the link storage 20, and as long as a function is provided for correcting a steering angle so as to be directed to a target point set on a target track, the expected arrival point calculator 2 and the corrected steering angle calculator 3 are not necessarily required.

Figure 11:
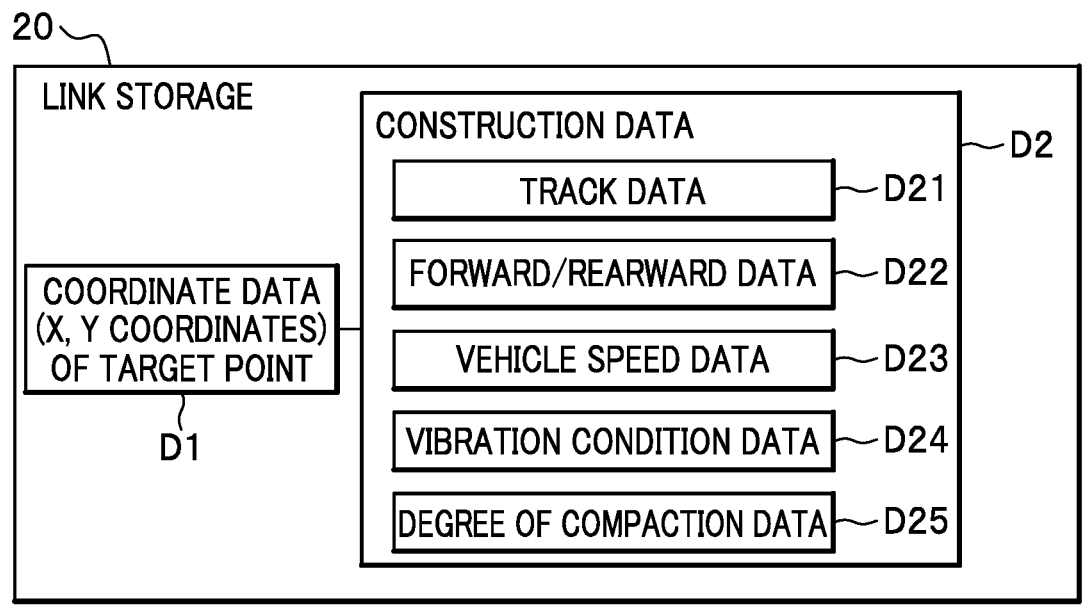
FIG. 11 is a diagram of a structure of a link storage.

As illustrated in FIG. 11, the link storage 20 stores coordinate data D1 of a target point having (x, y) coordinates linked with the construction data D2. The coordinate data D1 may be data obtained by GNSS (Global Navigation Satellite System) or the like, or may be calculated based on the obtained data, for example. The construction data D2 is ground-side data or vehicle-side data which affects compaction construction, and includes track data D21, forward/rearward data D22, and vehicle speed data D23, for example.

The track data D21 is data relating to a travel track geometry at a target point. For example, whether a track is a straight track or a curved track, and a curvature of a curved track and the like are stored as data.

The track data D21 may be created by:
i) storing whether a track is a straight track or a curved track in advance for each target point, or
ii) measuring in real time at the time of traveling.

Figure 12:
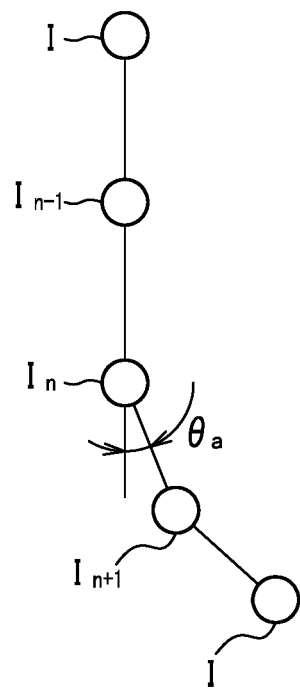
FIG. 12 is a diagram illustrating a procedure of calculating track data.
Figure 13:
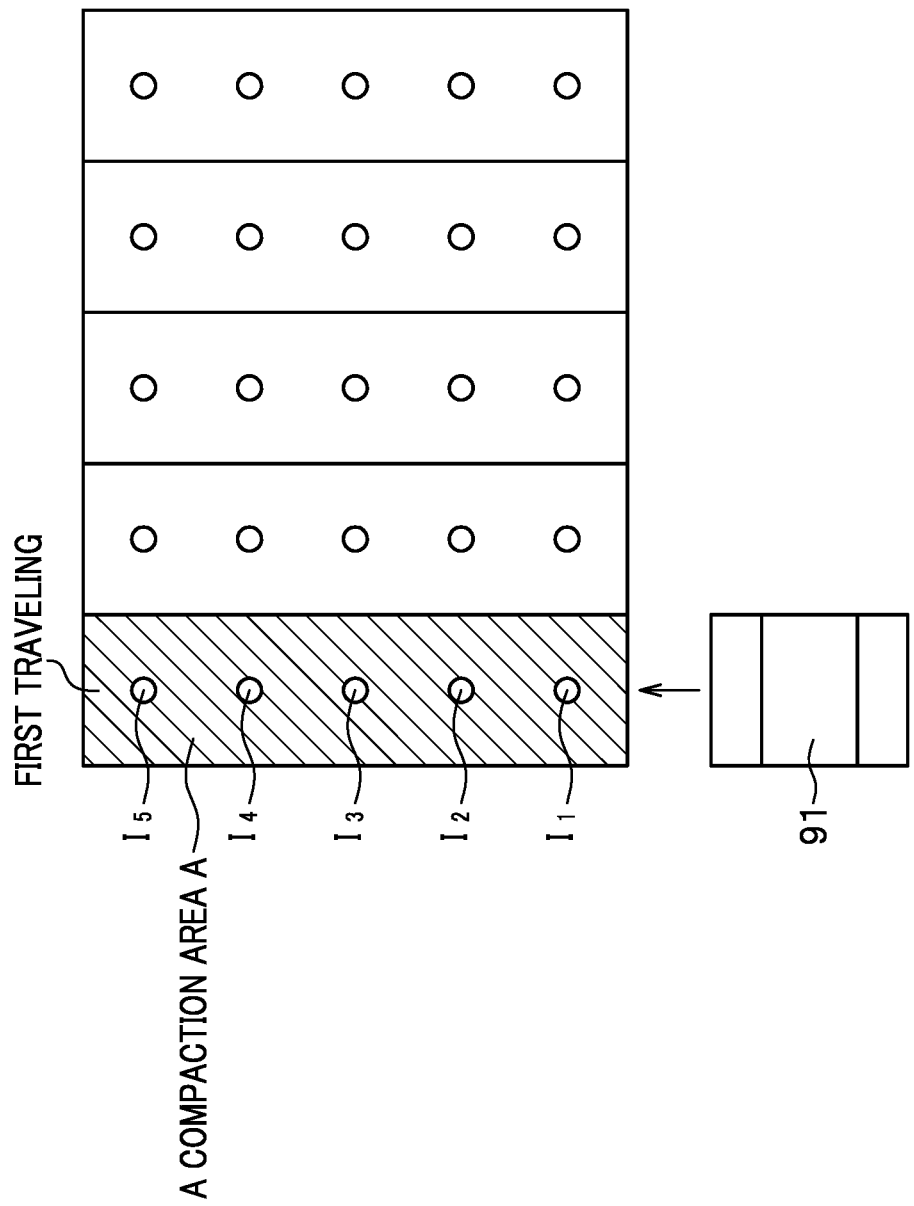
FIG. 13 is a plan view of a construction area after first traveling.

The vehicle travels based on the track data D21 stored in advance by the step i) at the time of initial traveling, and stored track data D21 is overwritten with the track data D21 measured in real time by the step ii) during the traveling, with linked with the coordinate data D1. Thus, a more accurate travel track is obtained. As a measurement method of the step ii), for example, as illustrated in FIG. 12, it is possible to accurately know whether the track is straight or curved based on an inclination ea of the track between the target points In and In+1 to the track between the target points In−1 and In.

Further, in a case of a curved track having an extremely large radius of curvature, the data thereof may be stored as a straight track. That is, when the radius of curvature is equal to or more than a threshold value, data thereof is impartially stored as a straight track.

In FIG. 11, the forward/rearward data D22 is data whether the vehicle travels forward or rearward at the target point. Normally, the compactor reciprocates in the compaction range so that the forward/rearward data D22 is overwritten and stored for each time the vehicle passes through.

The vehicle speed data D23 is data of a vehicle speed at the target point. The vehicle speed data D23 may have a fixed value at every target point or may be changed every time the vehicle passes through and stored to overwrite the previous data.

When the vehicle is a vibrating compactor including a vibrator 22 for compacting the ground by vibrating a rolling pressure wheel (drum) and a degree of compaction detection sensor 21 for detecting a degree of compaction of the ground, the construction data D2 may include vibration condition data D24 and degree of compaction data D25.

The vibrator 22 is a vibrating device provided in the drum, or the like, and may be a conventional one.

The degree of compaction detection sensor 21 is an acceleration sensor attached near the drum or the like and obtains a response acceleration signal from the ground to detect the degree of compaction of the ground.

The vibration condition data D24 is data for determining whether vibration is on or off or whether vibration force is "strong" or "weak" at the target point.

The degree of compaction data D25 is data of a degree of compaction W detected by the degree of compaction detection sensor 21.

A description will be given of an example of a compaction management procedure using the vibration condition data D24 and the degree of compaction data D25. FIGS. 13 to 16 each are a plan view of a construction area including columns of compaction areas. Target points I1 to I5 are set in the leftmost compaction area A. The vibration condition data D24 during a first traveling is set to have the vibration force being "strong" for all the target points, and the vehicle speed is set to be a constant moderate speed. When a vibration compactor 91 has completed the first traveling, the coordinate data D1 of the target points I1 to I5 is linked with the construction data D2 such as the degree of compaction data D25 obtained during the first traveling when stored.

Figure 14:
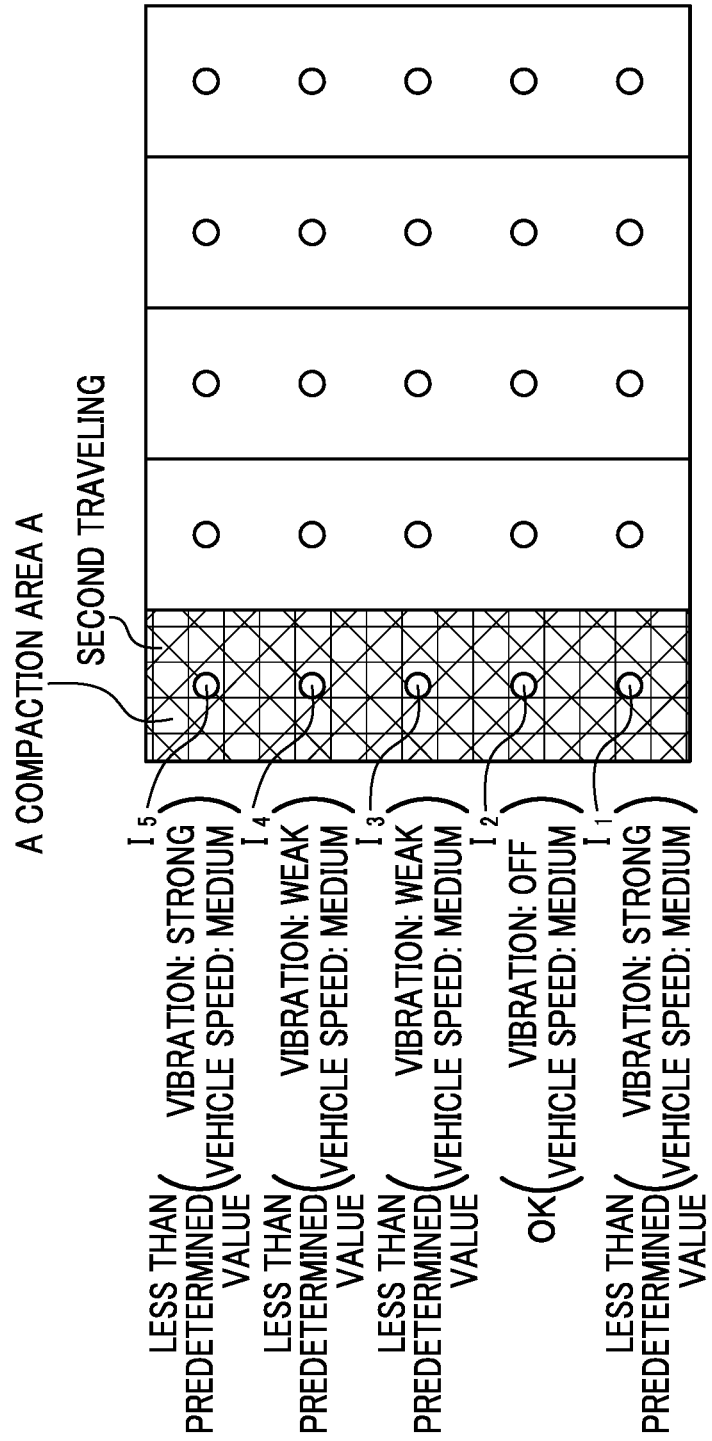
FIG. 14 is a plan view of the construction area before second traveling.

The automatic drive control unit 4 (FIG. 10) determines whether the degree of compaction data D25 at the target points I1 to I5 each has reached a predetermined value. It is assumed, as a result, that the degree of compaction data D25 at the target point I2 has reached the predetermined value at the target point I2, the degree of compaction is slightly less than the predetermined value at the target points I3, I4, and the degree of compaction is much less than the predetermined value at the target points I1, I5. As illustrated in FIG. 14, the automatic drive control unit 4 determines that no further compaction is necessary at the target point I2, and deactivates the vibration with the vibration condition data D24. The degree of compaction is slightly less at the target points I3 and I4 so that vibration force is changed to "weak." The degree of compaction is much less at the target points I1 and I5 so that vibration force remains "strong," and the vibration condition data D24 is overwritten. A second traveling is performed based on the overwritten vibration condition data D24. During the second traveling, the degree of compaction data D25 is overwritten with the data of the degree of compaction W from the degree of compaction detection sensor 21.

Figure 15:
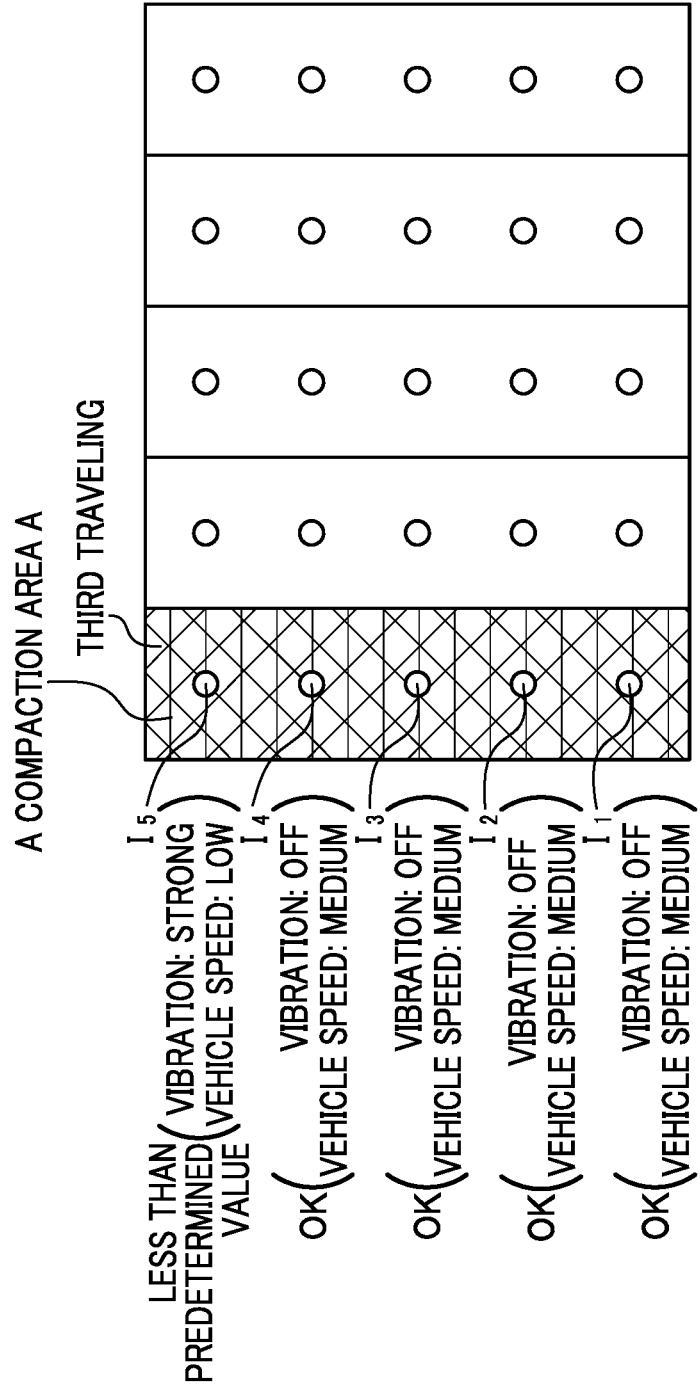
FIG. 15 is a plan view of the construction area before third traveling.

After the second traveling is completed, the degree of compaction data D25 at the target points I1 to I5 is similarly determined. It is assumed that the degree of compaction data D25 has reached the predetermined value at the target points I1 to I4 and is much less than the predetermined value at the target point I5. As illustrated in FIG. 15, the vibration is deactivated at the target points I1 to I4, and the vibration force remains "strong," the vehicle speed is set to "low speed," and the vibration condition data D24 is overwritten at the target point I5. Decreasing the vehicle speed causes the vibrating drum to stay longer, to apply much vibrating force at the target point. A third traveling is performed under this condition.

Figure 16:
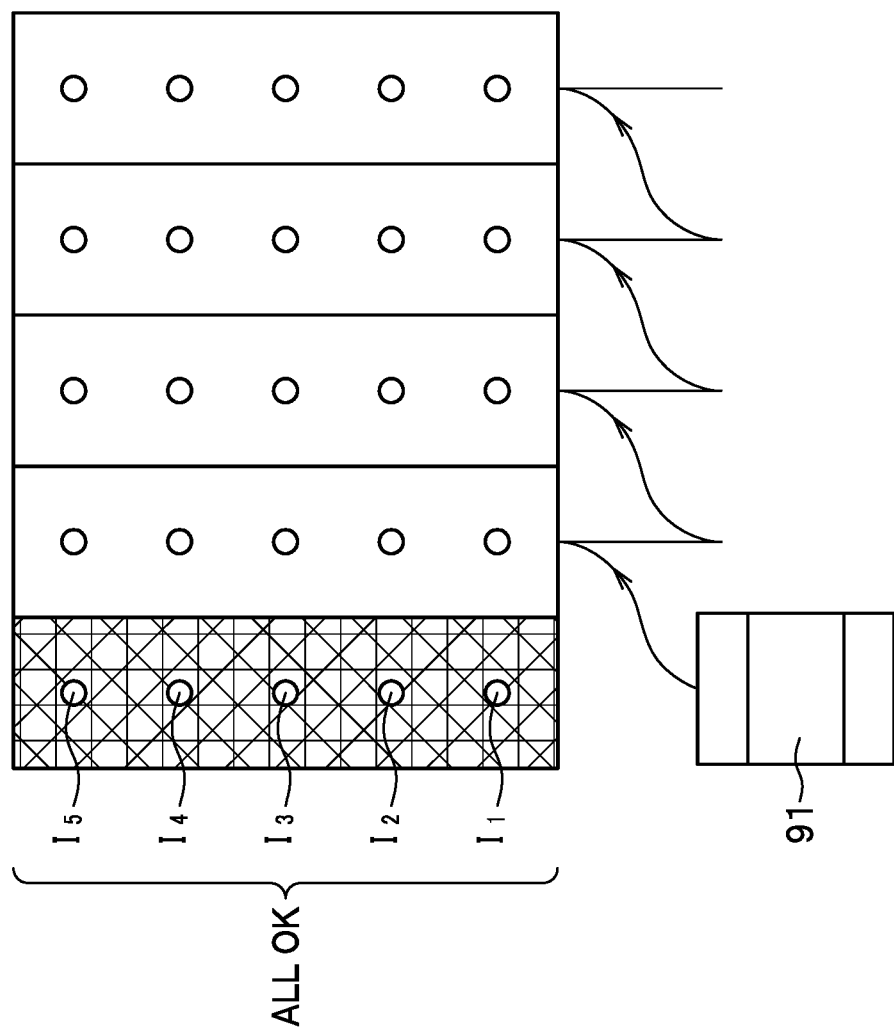
FIG. 16 is a plan view of the construction area after the third traveling.

As a result of determination after the third traveling, when the degree of compaction data D25 has reached the predetermined value at all the target points I1 to I5, the compaction construction at the leftmost compaction area A is regarded as being completed. Then, as illustrated in FIG. 16, the vibration compactor 91 moves to a next lane to perform compact construction with the same procedure.

FIG. 17 is a flowchart of the compaction management procedure. In step ST11, the automatic drive control unit 4 retrieves travel data including the coordinate data D1 of the predetermined target points and the construction data D2, and starts automatic driving in step ST12. When the compactor arrives at a predetermined compaction area, compaction by vibration is started in step ST13, and the coordinate data D1 of the target point is linked with the degree of compaction data D25 and is stored in the link storage 20 in step ST14. In step ST15, a determination is made whether the degree of compaction data D25 has reached the predetermined value. If it is No, the vibration condition data D24 or the vehicle speed is changed to an optimum value in step ST16, and the processing returns to step ST13. If it is Yes in step ST15, the compactor moves to a next compaction area, in step ST17. Note that, if the compaction area at a target point is not compacted equal to or more than the predetermined value even after the predetermined number of traveling, the traveling may be stopped to record the degree of compaction for later construction.

As described above, the link storage 20 which stores the coordinate data D1 of the target points linked with the construction data D2 provides the following advantageous effects.

An autonomous travel vehicle is capable of automatically managing the degree of compaction without an operator.

Further, an autonomous travel vehicle generally retrieves coordinate data of a target point from map data into autonomous drive software for traveling. That is, a program itself of the autonomous drive software usually does not include the coordinate data of the target point. Therefore, with the coordinate data D1 linked with the construction data D2 when stored, general-purpose autonomous drive software is almost used as it is, to reflect the construction data onto a construction area.

The construction data D2 includes the track data D21 of the target track so that the autonomous travel vehicle travels smoothly.

Further, the vibration compactor including the vibrator 22 and the degree of compaction detection sensor 21, has the construction data D2 including the vibration condition data D24 for the vibrator 22 and the degree of compaction data 25 which is the degree of compaction W detected by the degree of compaction detection sensor 21. Therefore, autonomous traveling of the vehicle and compaction management of the ground are easily linked with each other, to stabilize the quality of the degree of compaction and to improve the efficiency thereof.

REFERENCE NUMERALS

1: autonomous travel control device, 2: expected arrival point calculator, 3: corrected steering angle calculator, 4: automatic drive control unit, 20: link storage, 21: degree of compaction detection sensor, 22; vibrator, C: center pin, D1: coordinate data, D2: construction data, G1: target track (straight track), G2: target track (curved track), I: target point, M: target circle: ROv: target radius, θex: corrected steering angle

What is claimed is:

1. A construction-vehicle autonomous travel control device to correct a steering angle so as to direct a target point set on a target track comprising:
   an expected arrival point calculator to calculate an expected arrival point of a vehicle to arrive after a predetermined time based on a vehicle speed and a steering angle; and
   a corrected steering angle calculator to calculate a corrected steering angle so as to direct the expected arrival point to the target point,
   wherein a target circle is set about the expected arrival point;
      wherein the corrected steering angle calculator calculates the corrected steering angle so as to direct the expected arrival point to a next target point when the expected arrival point has approached within a predetermined distance from the target point and calculates the corrected steering angle so as to direct the expected arrival point to a target point outside the target circle, and
      wherein a radius of the target circle is variably set to be large when the target track is a straight track or a curved track having a large radius of curvature, and to be small when the target track is a curved track having a small radius of curvature.

2. The construction-vehicle autonomous travel control device as claimed in claim 1,
   wherein the construction-vehicle is a compactor to compact a ground with a drum, and
   wherein the expected arrival point is calculated based on a center point of the drum.

3. The construction-vehicle autonomous travel control device as claimed in claim 1, comprising a link storage storing coordinate data of the target point linked with construction data.

4. The construction-vehicle autonomous travel control device as claimed in claim 3, wherein the construction data includes track data of the target track.

5. The construction-vehicle autonomous travel control device as claimed in claim 3,
   wherein a vibrator to vibrate a rolling pressure wheel to compact a ground and a degree of compaction detector to detect degree of compaction of the ground are provided in a vehicle, and
   wherein the construction data includes vibration condition data of the vibrator and degree of compaction data detected by the degree of compaction detector.

6. The construction-vehicle autonomous travel control device as claimed in claim 5, wherein, when the vehicle reciprocates on the target track, the vibration condition data is changed for a next traveling based on a degree of compaction for every target point stored at a previous traveling.

7. The construction-vehicle autonomous travel control device as claimed in claim 5, wherein, when the vehicle reciprocates on the target track, a vehicle speed is changed for a next traveling based on a degree of compaction for every target point stored at a previous traveling.

8. A construction-vehicle autonomous travel control device to correct a steering angle so as to direct a target point set on a target track comprising:
   an expected arrival point calculator to calculate an expected arrival point of a vehicle to arrive after a predetermined time based on a vehicle speed and a steering angle; and
   a corrected steering angle calculator to calculate a corrected steering angle so as to direct the expected arrival point to the target point,
   wherein a target circle is set about the expected arrival point;
   wherein the corrected steering angle calculator calculates the corrected steering angle so as to direct the expected arrival point to a target point outside the target circle, and
      wherein a radius of the target circle is variably set to be large when the target track is a straight track or a curved track having a large radius of curvature, and to be small when the target track is a curved track having a small radius of curvature.

* * * * *